Patented Oct. 17, 1950

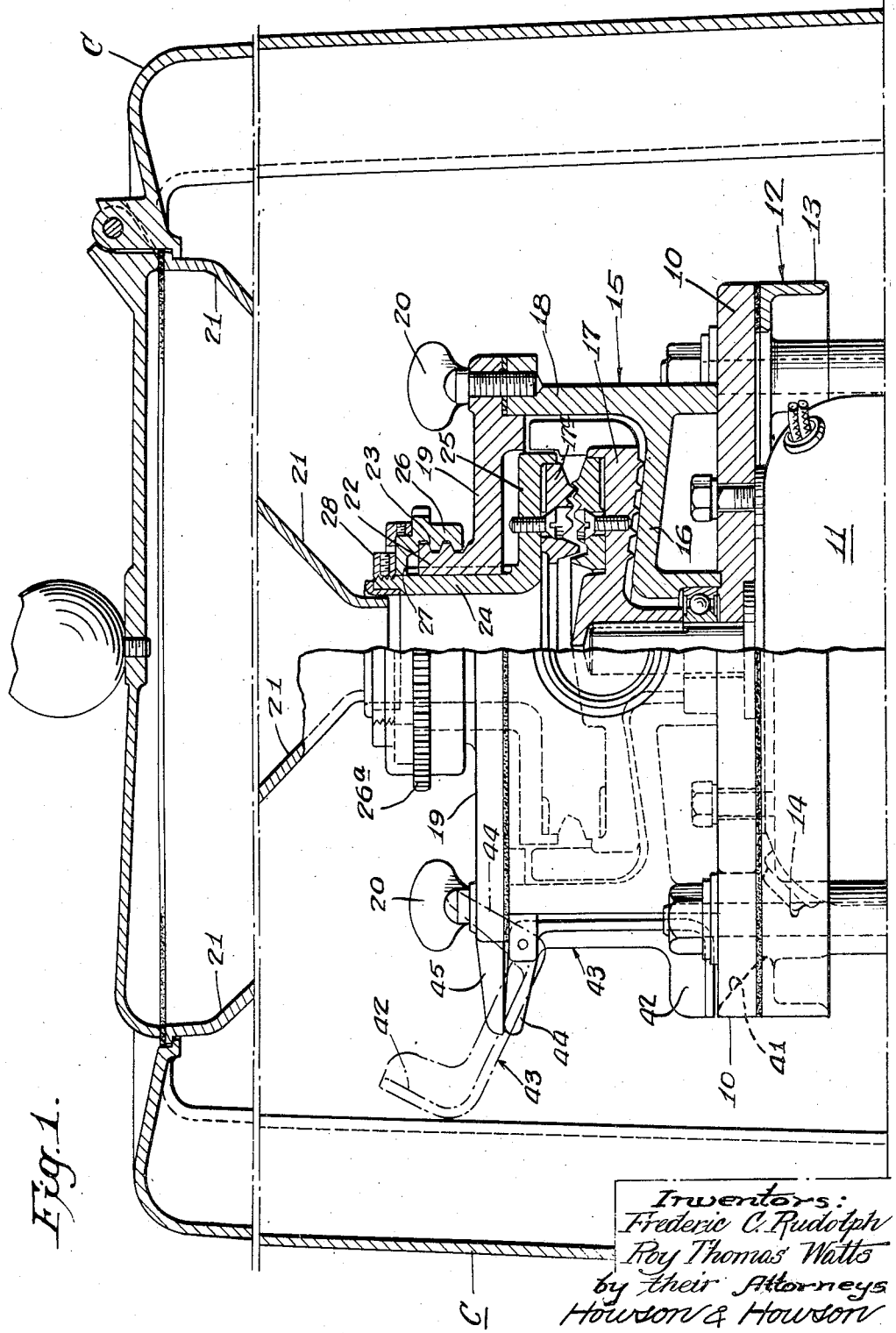

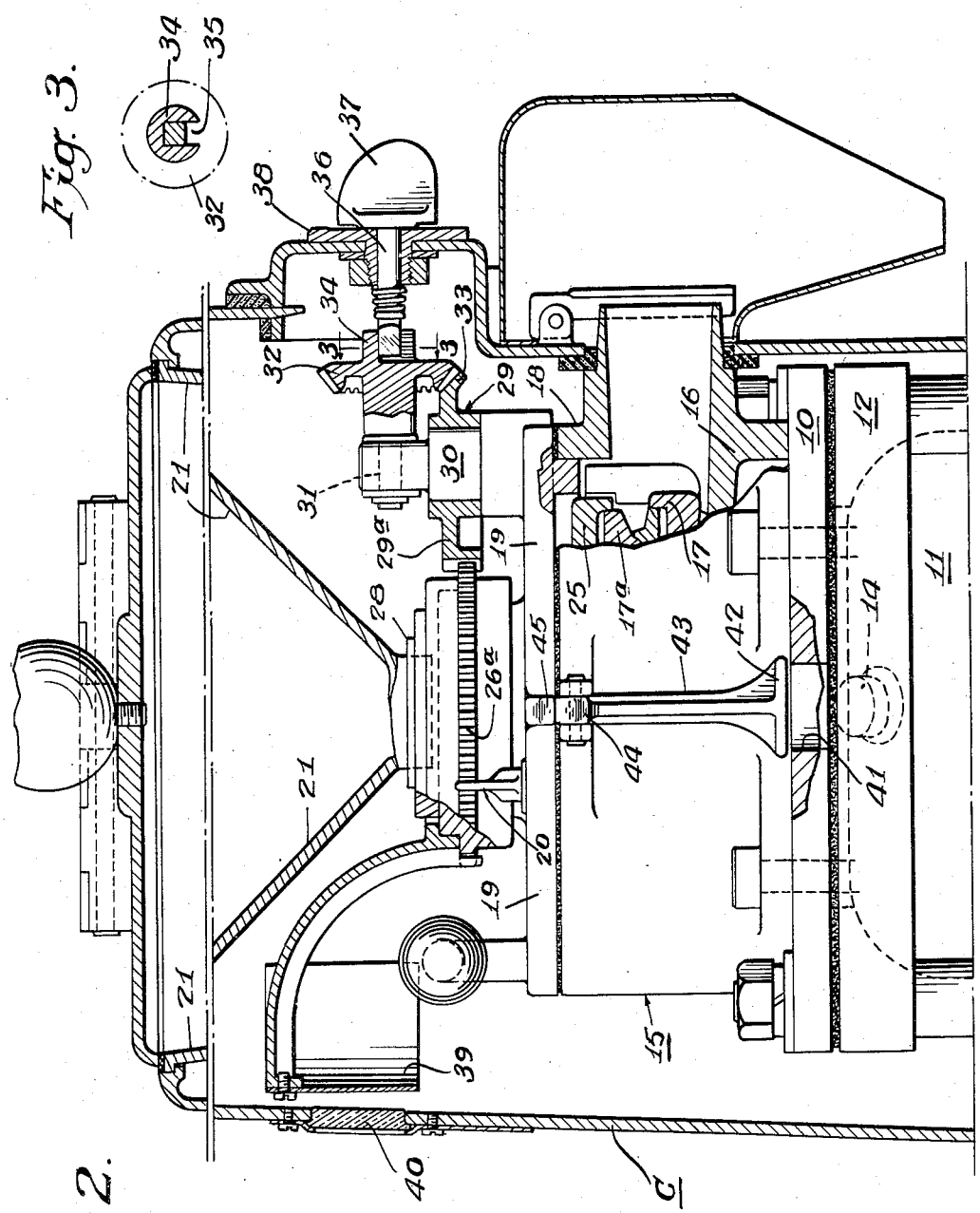

2,526,160

UNITED STATES PATENT OFFICE 2,526,160

COFFEE MILL WITH OVERLOAD RELEASE MEANS

Frederic C. Rudolph and Roy Thomas Watts, New York, N. Y., assignors to The Enterprise Manufacturing Company of Pennsylvania, Philadelphia, Pa., a corporation of Pennsylvania Original application October 3, 1946, Serial No. 700,942. Divided and this application January 20, 1948, Serial No. 3,278

1 Claim. (Cl. 241—33)

This invention relates to coffee mills and is a division of our co-pending application Serial No. 700,942, filed October 3, 1946, now abandoned. More particularly this invention relates to that type of coffee mill commercially employed in retail stores and having an index visible to the customer advising of the type of grind being prepared, selection of the type of grind being controlled by the attending clerk.

Mills of this type usually are operated by persons having little or no knowledge of mechanics and who, accordingly, are liable to ascribe stoppage of the mill to other than the true cause and may, in attempting to force operation of the mill, cause considerable damage thereto. This condition is particularly aggravated when stoppage is the result of the introduction of any foreign substance between the burrs of the mill since, in the ordinary mill construction, access to the burrs is usually extremely difficult and calls for the services of a skilled mechanic.

An important object of the present invention is the provision of a construction permitting ready adjustment of the burrs for change of grind while, at the same time, permitting the upper burr to be readily removed for removal of any foreign substance which may have been introduced between the burrs.

Another object of the invention is the provision of a mill of this character in which the drive motor circuit is provided with an overload cutout together with means rendering this overload cutout inaccessible until the burrs have been separated to permit inspection thereof and removal of foreign substances which are the most common cause of overload shutdown.

These and other objects are attained by the arrangement shown in the accompanying drawings wherein, for the purpose of illustration, is shown a preferred embodiment of my invention and wherein:

Fig. 1 is a fragmentary elevational view partially in section illustrating a coffee mill embodying the invention;

Fig. 2 is a view similar to that of Fig. 1 but taken at right angles thereto; and Fig. 3 is a sectional view taken on line 3—3 of Fig. 2.

Referring now more particularly to the drawings, numeral 10 generally designates a base plate supporting a drive motor 11 employed in the operation of the mill. This base plate is seated upon a frame 12 having a depending flange 13 which renders inaccessible an overload cutout 14 for motor 11 which is at present illustrated as secured directly to the motor casing. Seated upon the base plate 10 is a burr casing 15 comprising a lower member having a downwardly and outwardly inclined wall 16 over which the rotating burr 17 of the mill operates and having a peripheral upstanding flange 18 seating the top plate 19 of the burr casing. Top plate 19 is directly removable upon removal of thumb screws 20, access to which may be had by removal of the hopper 21 employed to deliver the coffee to the burr casing for grinding between the burr 17 and stationary burr 17a.

The removable cover 19 of the burr casing has an axial opening defined by an upstanding flange 22, the exterior of which is provided with worm thread 23 and the interior of which is splined to an upstanding neck 24 on stationary burr plate 25. Engaged with the worm threads of flange 22 of cover plate 19 is a nut 26, the upper end of which has an internal flange seated upon a shoulder 27 on neck 24 and maintained in engagement with this shoulder by a stop nut 28. The exterior of nut 26 is provided with a spur gear 26a meshing with spur gear segment 29a of composite gear 29 mounted on stud 30 arising from the removable cover plate 19. The stud 30 rotatably mounts the inner end of a horizontal stud 31 projecting from the inner end of a bevel gear 32, which bevel gear engages a bevel segment 33 on composite gear 29. The outer end of bevel gear 32 has a horizontal socket extension 34, one side of which is open at 35 and receives the polygonal end of an operating shaft 36 operated by the attendant for the purpose of varying the relative axial positions of burrs 17 and 17a. This shaft is extended through the wall of a finish casing C and is provided with an operating head 37 and a co-operating dial 38. The adjusting nut 26 may conveniently support a customer's indicator 39 observable through a window 40 in the finish casing C.

Overload switch 14 is accessible for re-seating through an opening 41 formed in base plate 10 and opening vertically therethrough. In the operative position of the grinding mechanism as just described, this opening is concealed by the foot 42 of a bell crank lever 43, one arm of which lies flatly against the vertical flange 18 of the burr casing and bears foot 42 and the other arm of which, indicated at 44, underlies an extension 45 formed on the top plate 19 of the burr casing. It will be seen that, following an overload shutdown of motor 11, the motor can only be restarted by displacement of lever 43 necessitating removal of cover plate 19 with resultant removal of the upper or stationary burr and consequent ease of inspection to determine the presence of foreign substances. It would also be obvious that the operations attending the removal of this cover plate are those which can be readily accomplished by an ordinary employee. These consist simply of removing hopper 21, positioning the adjusting handle 37 to a position where the gear 32 may be vertically elevated enabling the inner end of the shaft 36 to pass through the side opening 35 of socket 34, and removing thumb screws 20.

Since the construction, as illustrated, is obviously capable of considerable modification without departing from the spirit of the invention, we do not wish to be understood as limiting ourselves thereto except as hereinafter claimed.

We claim:

In a mill, relatively rotating burrs, a motor to cause such relative rotation, a housing for the burrs including a removable section mounting one of said burrs, an overload switch for the motor, a shield for said switch having an access opening therein, a bell crank lever having one arm thereof providing a portion forming a cover for said opening, and means on the said section having engagement with the other arm of said lever preventing movement thereof until said section is removed.

FREDERIC C. RUDOLPH.
ROY THOMAS WATTS.

REFERENCES CITED

The following references are of record in the file of this patent:

UNITED STATES PATENTS

| Number | Name | Date |
| --- | --- | --- |
| 1,586,694 | Peters | June 1, 1926 |
| 1,587,104 | Dryden | June 1, 1926 |
| 1,633,844 | Buckwalter | June 28, 1927 |
| 1,865,438 | Friedman | July 5, 1932 |
| 2,059,106 | Hess | Oct. 27, 1936 |
| 2,156,075 | Alexay | Apr. 25, 1939 |